F. G. GALE.
ELECTRIC WELDING MACHINE.
APPLICATION FILED OCT. 21, 1921.

1,434,285.

Patented Oct. 31, 1922.
8 SHEETS—SHEET 5.

Inventor.
Francis G. Gale
by Heard Smith & Tennant
Attys.

Patented Oct. 31, 1922.

1,434,285

UNITED STATES PATENT OFFICE.

FRANCIS G. GALE, OF WATERVILLE, QUEBEC, CANADA.

ELECTRIC WELDING MACHINE.

Application filed October 21, 1921. Serial No. 509,256.

*To all whom it may concern:*

Be it known that I, FRANCIS G. GALE, a subject of the King of Great Britain, residing at Waterville, Province of Quebec, Dominion of Canada, have invented an Improvement in Electric Welding Machines, of which the following description, in connection with the accompanying drawing, is a specification, like characters on the drawing representing like parts.

This invention relates to electrical welding machines and has for its object to provide a novel machine which is constructed to weld the ends of a plurality of tubes or bars simultaneously to the side of another tube or bar. The product thus produced in the machine can be used for various purposes where a plurality of tubes or bars are to be connected at their ends to another tube or bar.

Merely as illustrating one well-known article embodying this construction, I would refer to the end frame of a bedstead which is constructed with top and bottom rails connected to the posts, and which is provided with a plurality of vertically-extending fillers between the top and bottom rails and having their ends secured to the top and bottom rails. A machine embodying the invention and constructed to produce an article of this nature would be provided with means for holding in proper relation the tubes or bars constituting the fillers, and means for supporting the tube constituting the top or bottom cross rail in position so that the ends of the fillers engage the side of the cross rail, tube or bar, and means for electrically welding simultaneously the ends of all the fillers to the cross rail.

The above reference to bed frame ends is made merely as an illustration and not with any intent to limit the application of the invention, as the invention is equally well adaptable for welding the ends of a plurality of tubes or bars to the side of another tube or bar, regardless of the use to which the completed article is to be put.

In order to give an understanding of the invention, I have chosen to illustrate it herein as it might be embodied in a machine for making a welded bed frame end, but I desire to state that the invention is not limited to the particular embodiment illustrated.

Figures 19, 20, 21, 22, 23:
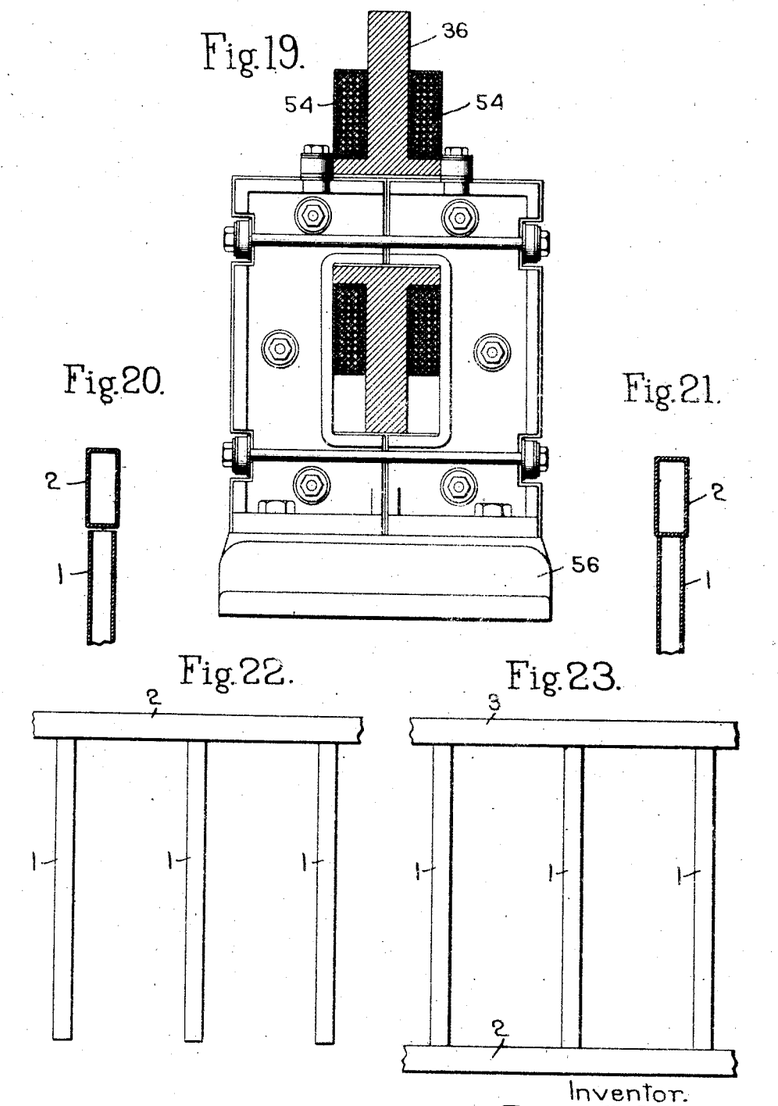
Fig. 19 is a sectional view of one of the transformers.
Figs. 20 to 23 show steps in the operation of making a welded bed frame.

Before proceeding to describe the machine, I will refer briefly to Figs. 22 and 23 which show the product produced on the machine. Fig. 22 shows a plurality of tubes or bars 1 having their ends welded to the side of a tube or bar 2, thus making an integral structure of the tubes 1 and 2. This invention is constructed to simultaneously weld the ends of any desired number of tubes or bars 1 to the side of another tube or bar 2. In Fig. 23 a construction is shown in which the tubes or bars 1 are welded at each end to the side of another tube or bar, said tubes or bars being welded at one end to the tube or bar 2 and at the other end to the side of another tube or bar 3. While the invention can be used for welding either tubes or bars, I will for convenience hereinafter refer to the parts to be welded as tubes, this being done in order to simplify the description, but not for the purpose of limiting the invention.

The machine is constructed so as to produce the construction shown in Fig. 23 as well as that shown in Fig. 22. In order to weld simultaneously the ends of a plurality of tubes 1 to the side of a tube 2, I provide means for holding the tubes 1 in proper spaced relation and for maintaining the tube 2 in proper position to be welded to the tubes 1, and I also provide a plurality of pairs of welding contacts, one pair for each of the tubes 1, each pair of welding contacts comprising a contact element adapted to surround the tube 1 at the end thereof which is to be welded to the side of the tube 2 and which is referred to as a tube-end-engaging contact and another contact element (referred to as a tube-side-engaging contact) adapted to engage the side of the tube 2 which is to be welded to the tube 1 at each side of the tube 1. I also provide a suitable transformer mechanism for each pair of contacts constructed to send a welding current from one contact of each pair to the other contact of said pair through the end of the tube 1 and side of the tube 2, the construction being such that all of the welding transformers are rendered operative simultaneously to weld simultaneously the ends of all of the tubes 1 to the side of the tube 2.

The pairs of welding contacts, transformers, etc., are mounted on a frame 4 which may have any suitable construction. The frame herein illustrated comprises two end members 5 which are connected by cross-girders 6, 7 and 8. There are two cross-girders or tie members 7 and two cross-girders or tie members 8, the reason for which will be more fully hereinafter set forth.

Figure 1:
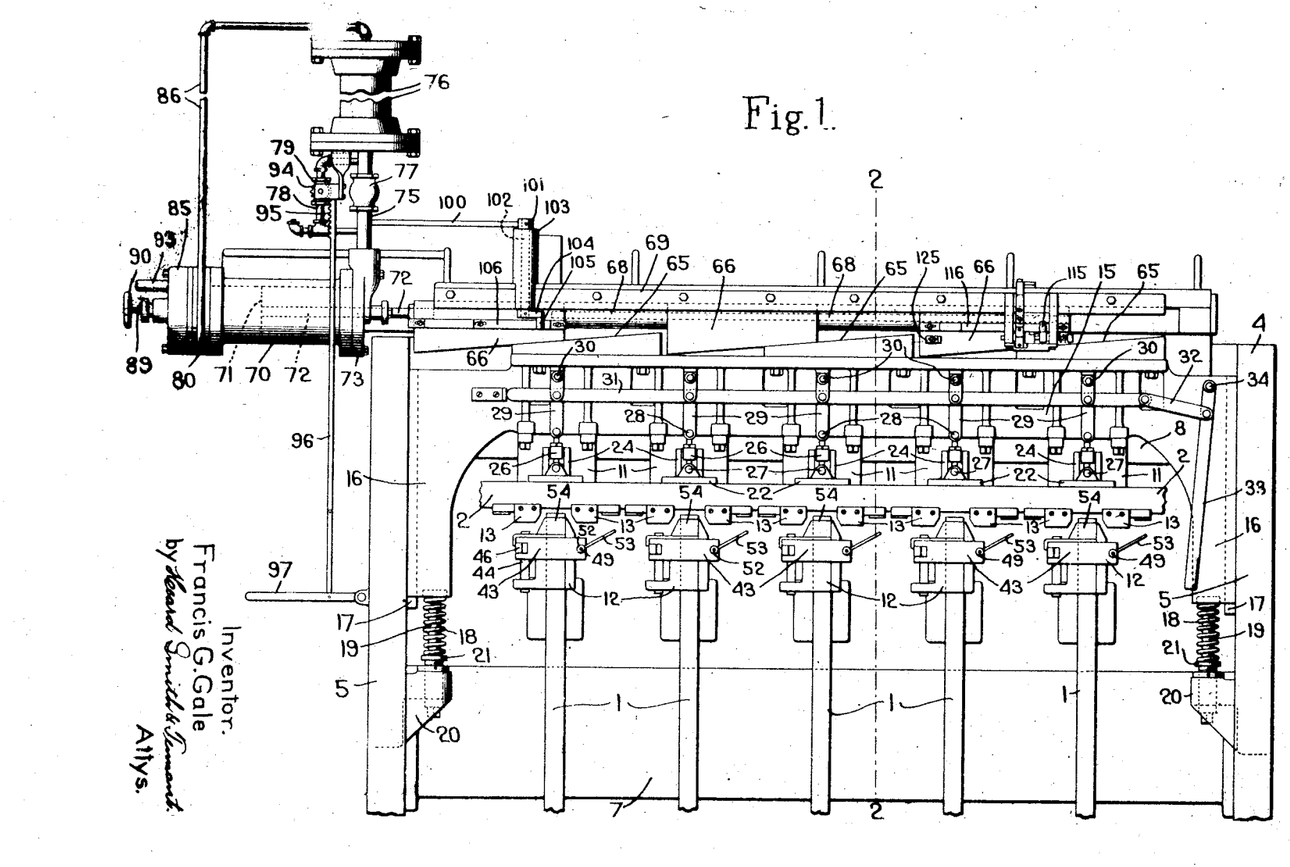
Fig. 1 is a front elevation of a machine embodying the invention.
Figure 2:
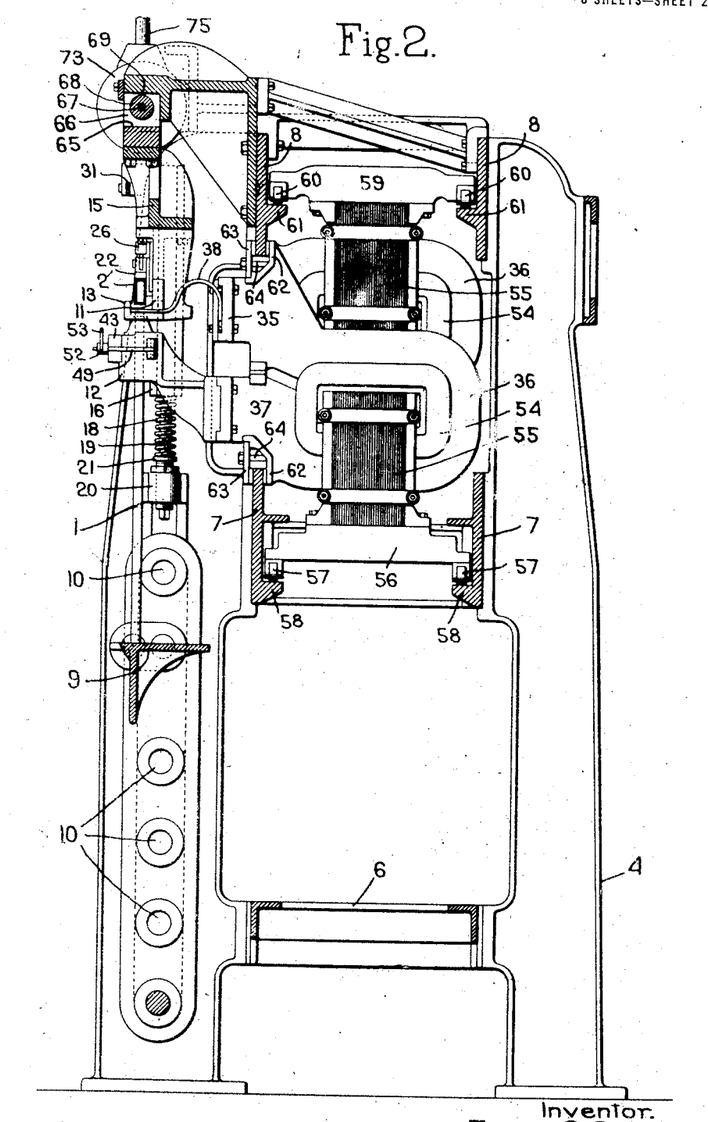
Fig. 2 is a vertical sectional view on substantially the line 2—2, Fig. 1.

The machine herein illustrated is so constructed that the tubes 1 are sustained therein in an upright position while the tube 2 is in a horizontal position at the upper ends of the tubes 1. Fig. 1 shows the tubes in the position they occupy relative to each other during the welding operation.

The tubes 1 are supported at their lower ends upon a tube-supporting member 9 which is adjustably sustained in the frame to accommodate tubes of different lengths. This tube-supporting member is in the form of a shelf or ledge extending across the front of the machine and having projections at its ends adapted to enter any one of a plurality of sockets 10 formed in the frame 4. By this means the tube-supporting member 9 may be adjusted into different vertical positions to accommodate tubes 1 of different lengths.

Each pair of welding contacts comprises a contact element 11 adapted to engage the side of the tube 2 and another contact element 12 adapted to engage the upper end of a tube 1. There will be as many of these pairs of welding contacts 11, 12 as there are tubes 1 to be welded to the tube 2. In the illustrated embodiment of the invention there are five tubes 1 and therefore five pairs of welding contacts. Each welding contact 11 is provided with two arms 13 that are shaped to engage the under side of the tube 2 and partially embrace the latter, said arms 13 of each contact 11 thus having engagement with the side of the tube 2 at two separated points. For this reason said contact is referred to as a tube-side-engaging contact.

Each welding contact 12 which engages the upper end of a tube 1 is arranged to be received between the arms 13 of the corresponding contact 12 as will be presently described.

The welding contacts 11 are all secured to a girder or support 15 which extends the length of the machine and is vertically movable on the end frames 5, said girder being provided with shoes or guiding portions 16 at its end which are guided by suitable ways 17 formed on the end frames 5. The girder is yieldingly sustained by means of springs 18 which encircle posts 19 rising from brackets 20, said springs resting on adjustable collars 21 which screwthread into the brackets and by which the tension of the springs can be varied.

Means are provided for clamping the tube 2 firmly against the arms 13 of the contacts 11 during the welding operation. Said clamping means herein comprises a clamping member 22 associated with each contact 11 and adapted to engage the top of the tube 2 and hold it firmly against the arms 13. Each clamp 22 is carried by a block 23 which is slidable vertically in ways 24 formed on a bracket 25 secured to and depending from the member 15. Each clamping member has a link 26 pivoted thereto at 27 and each link is pivotally connected at 28 to an arm 29 that is pivoted at 30 to the member 15. Each pair of arms 26, 29 constitute a toggle device, which when straightened, forces the clamping member 2 downwardly.

Figure 6:
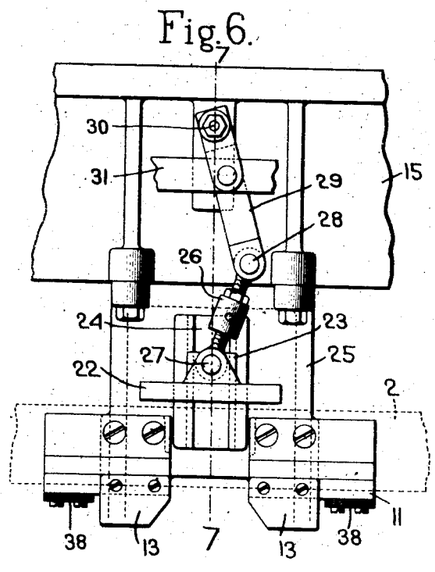
Fig. 6 is a view showing one of the contacts for engaging the side of the tube.
Figure 7:
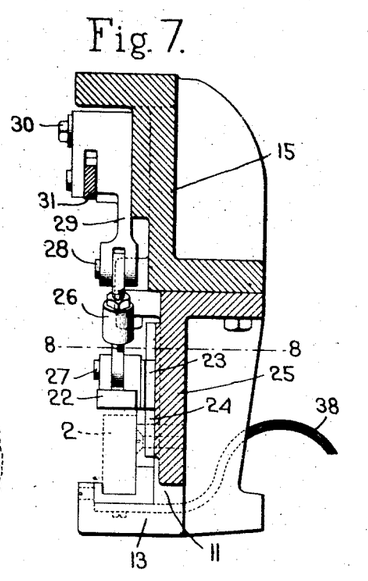
Fig. 7 is a section on the line 7—7, Fig. 6.
Figure 8:
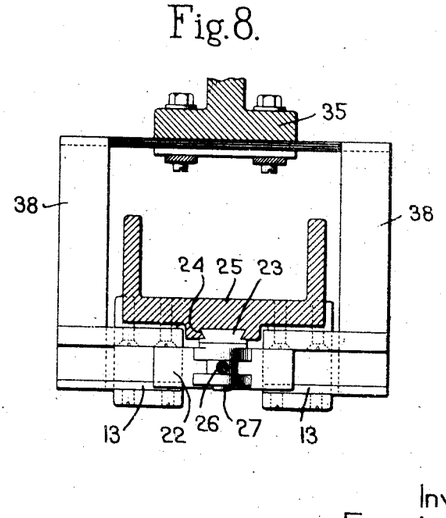
Fig. 8 is a section on the line 8—8, Fig. 7.

Means are provided for operating all the clamping devices 22 simultaneously and for this purpose the arms 29 are all connected to a bar 31 which in turn is connected by a link 32 to a lever 33 that is pivoted to the member 15 at 34. The swinging movement of the lever in one direction will break the toggle devices and raise the clamps 22 into the position shown in Fig. 6 and a swinging movement in the other direction will straighten the toggles and thus bring the clamps into clamping engagement with the tube 2 as shown in Fig. 1.

The links 26 are made adjustable as to their length so as to provide for tubes 2 of different vertical dimension.

When any tube 2 is clamped against the contacts 11 as shown in Fig. 1 it will be firmly retained in position until the clamps are released.

Each member 11 is connected to one of the poles 35 of a transformer 36 and the other pole 37 of each transformer is connected to the corresponding contact that engages the end of a tube 1. The connection between each welding contact 11 and its transformer is a flexible connection so as to permit the contact to have a vertical movement. This flexible connection is herein indicated at 38 and it is in the form of flexible copper or brass strips connected at one end to the contact 11 and at the other end to the transformer pole 35. The flexibility of the strips 38 permit the necessary vertical movement of the contact 11.

Figure 3:
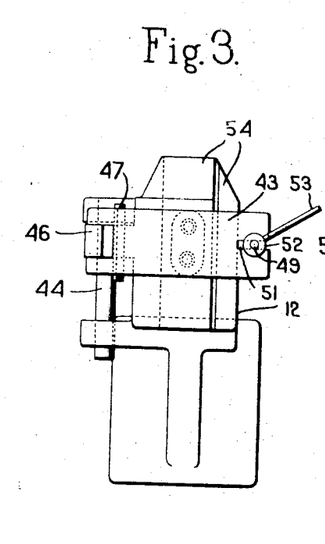
Figs. 3 and 4 are front and side views of the contact for engaging the end of the tube.
Figure 4:
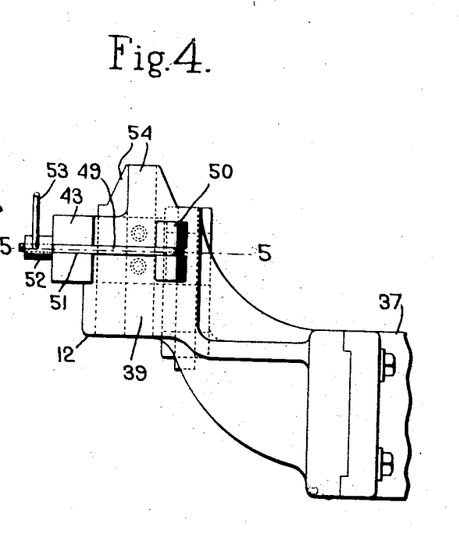
Figure 5:
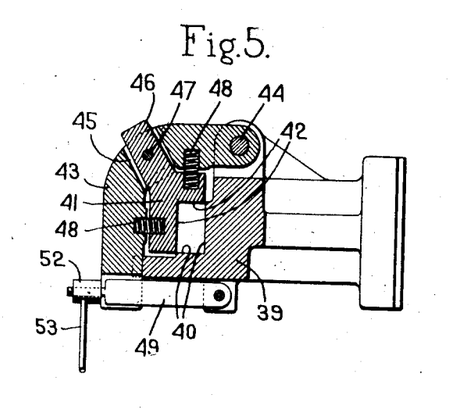
Fig. 5 is a section on the line 5—5, Fig. 4.

The welding contacts 12 which engage the upper ends of the tubes 1 have a construction best seen in Figs. 3, 4 and 5. Each contact comprises a fixed member or jaw 39 provided with contact surfaces 40 that engage two sides of the tube 1, and a movable member or jaw 41 having faces 42 to engage the other sides of the tube. The form of contact shown is one adapted to receive a tube which is rectangular in cross section but if a tube of any other shape is to be used then the faces 40, 42 will be correspondingly shaped. The jaw 41 is mounted in a swinging arm 43 which is pivoted to the fixed jaw at 44. This arm 43 has an opening 45 extending therethrough and the jaw 41 has a stem 46 which extends through the opening, said stem being pivoted to the jaw at 47. The jaw is yieldingly held in central position by two springs 48. The arm 43 is locked in its operative position by means of a locking member 49 pivoted to the fixed jaw at 50 and adapted to enter a slot 51 formed in the end of the arm at 43. The member 49 has a clamping nut 52 screw-threaded thereto, said nut having a handle 53 by which it may be turned.

When the nut is backed off then the locking member 49 can be swung out from the slot 51 thereby unlocking the arm 43 and permitting it to be opened away from the fixed jaw 39. When the arm is thus in open position a tube 1 may be placed against the faces 40 of the fixed jaw after which the arm 43 is swung into its closed position, shown in Fig. 5 and is locked therein by the member 49. The swinging of the arm into closed position brings the faces 42 against the tube and the latter will thus be firmly clamped between the jaws 39 and 41. These jaws have the up-standing extensions 54 which embrace the tube 1 near its end, said extensions being tapered to fit between the arms 13. The jaw 39 is secured to the pole 37 and the transformer.

As stated above there is a transformer for each pair of contacts, which transformer comprises a secondary 36 having the two terminals 35, 37 to which the contact of a pair of welding contacts are secured as above stated. The primary of each transformer is shown at 54 and it is formed in two parts, one situated either side of the secondary 36. Each secondary has associated therewith a laminated core 55 which embraces one side thereof but is insulated therefrom, each core being firmly clamped to the transformer and operating as a start therefor.

The transformers are adjustably sustained on the cross girders 7, 8, provision being made for adjusting the transformers toward and from each other, so as to properly space the various welding contacts to correspond to the desired spacing of the tubes 1. The transformers are also preferably arranged in staggered relation so as to provide for adjusting them nearer together than would be possible if they were all in line with each other. The transformers are thus arranged in two horizontal rows, the alternate transformers being supported at one level and the other transformers at another level. The transformers which are at the lower level are each adjustably supported on the cross girders 7 while those situated at the higher level are supported on the cross girder 8. The shape of the transformers is such, however, that the pairs of welding contacts for all the transformers come in line with each other.

The transformers situated on the lower level are each suported on a base 56 which in turn rests on rolls 57 that are mounted on tracks 58 formed on the girder 7. The upper set of transformers are hung from supports 59 that are mounted on rolls 60 operating on tracks 61 formed on the upper girders 8.

The transformers may thus be readily adjusted so that they will be properly spaced from each other. Means are provided for clamping the transformers firmly in adjusted position and for this purpose each transformer is formed with a fixed jaw 62 adapted to engage the edge of either the girder 7 or 8, and is also provided with the movable clamping jaw 63 adapted also to engage said girder. Each pair of clamping jaws are connected by a clamping bolt 64 and when the bolts are tightened the jaws will be firmly clamped to the edges of the girders thus locking the transformers in position. These clamping jaws are suitably insulated from the girders to prevent any short circuiting.

The machine herein illustrated is designed to make the weld by first bringing the ends of the tubes 1 close to but not into firm engagement with the side of the tube 2 and then applying the welding current, thus producing a sparking contact between the ends of the tubes 1 and the side of the tube 2, which sparking contact is continued until the side of the tube 2 where the welds are to occur has been properly heated. The tube 2 is then forced into firm contact with the ends of the tube 1, thus making the weld. When the welding current is turned on, the end of each tube 1 will be brought to welding temperature before the side of the tube 2 has been heated to welding point, and during the sparking contact, the end of the tube 1 will be burnt away more or less, the excessive heat developed at the end of the tube 1 operating to assist in heating the side of the tube 2. When the side of the tube 2 where the weld is to occur has been properly heated, the tube 2 is forced against the ends of the tube 1 and the weld is completed. This operation is illustrated in Figs. 20 and 21. Fig. 20 shows the end of a tube 1 closely adjacent to but not in firm contact with the side of a tube 2. This is the position of the parts when the current is turned on. When the welding current is applied, the end of the tube 1 will become heated much more quickly than the side of the tube 2 and because the tubes are not held in firm contact, there will be a sparking action between the tubes.

This will result in burning away the end of each tube 1 and as the ends of the tube 1 burn away the member 15 carrying the tube 2 is slowly moved downward so as to maintain the proper distance between the end of the tube 1 and the side of the tube 2 to support this sparking contact. When the side of the tube 2 where the welding is to occur has been brought to welding temperature then the member 15 is given a quick downward movement to force the tube 2 into firm engagement with the end of the tube 1 thus effecting the weld as shown in Fig. 21. At this time the transformer circuits are opened.

The present invention includes means for automatically moving the member 15 downwardly with a slow movement during the sparking contact and then moving it downward with a faster movement when the side of the tube 2 has reached a welding temperature. The machine is also provided with means for automatically opening the circuit of the transformers at the proper time during the making of the weld.

For giving the member 15 and the tube 2 supported thereby the above-described downward movement during the welding operation, said member 15 is provided with a plurality of inclined or wedge surfaces 65 which cooperate with a plurality of wedge members 66 that are confined between a guide 69 formed on the frame and the wedge surfaces 65. These wedge members 66 are connected by a rod 67 held properly spaced from each other by separators 68 mounted on said rod. During the movement of the wedge members toward the right Fig. 1 they will co-operate with the inclined faces 65 to force the member 15 downwardly, said wedge members during said movement being wedged between the guide 69 and the faces 65. During this downward movement the springs 18 are compressed and when the wedges are moved toward the left Fig. 1 the springs will elevate the member 15.

The means for moving the wedges is constructed so as to give them first a slow movement to the right which results in moving the tube 2 downwardly with a slow movement, this being the movement which the tube has during the sparking contact after which the wedges 9 give a more rapid movement thereby to bring the tube 2 firmly against the ends of the tube 1 to form the weld. The means herein shown for this purpose comprises a cylinder 70 in which operates a piston 71 provided with a piston rod 72 that is connected to the wedges 66. The cylinder head 73 is provided with a port 74 therein which communicates with a pipe 75 leading to a reservoir 76, said pipe having a valve 77 therein. 78 is a by-pass around the valve 77, said by-pass having a valve 79 therein. The valve 79 and the by-pass 78 are smaller than the pipe 70 and valve 77 so that when the by-pass valve is open and the other valve closed there will be a restricted communication between the chamber 76 and the cylinder 70 while when the valve 77 is open there will be a free communication between said chamber and cylinder. The cylinder 70 will preferably be filled with oil or water or some similar liquid and as the piston is moved to the right the oil or water will be transferred from the cylinder to the chamber 76 through either the pipe 75 or the by-pass 78, and the speed at which the piston can move will depend upon which of the valves 77 and 79 are open. If the by-pass valve 79 only is open then the piston will have a relatively slow movement but if the main valve 77 is open the piston can move much more rapidly.

Figure 12:
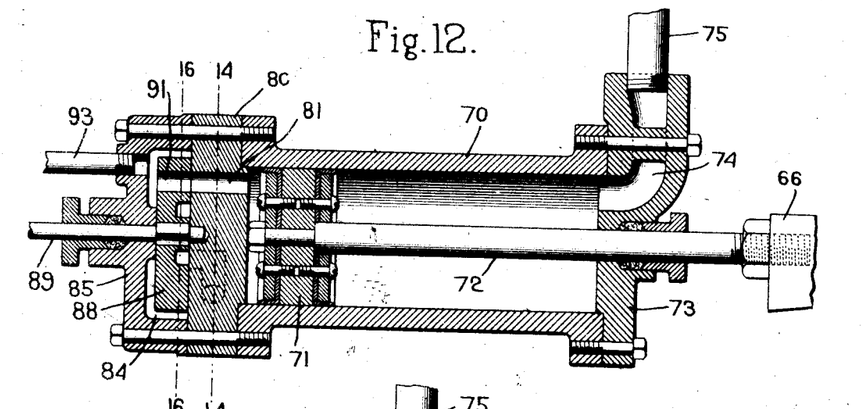
Fig. 12 is a view of the cylinder and piston by which the relative movements of the contacts are controlled.
Figure 13:
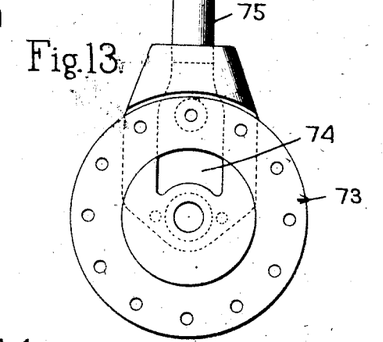
Fig. 13 is a sectional view of the head of the cylinder looking toward the right, Fig. 12.
Figure 14:
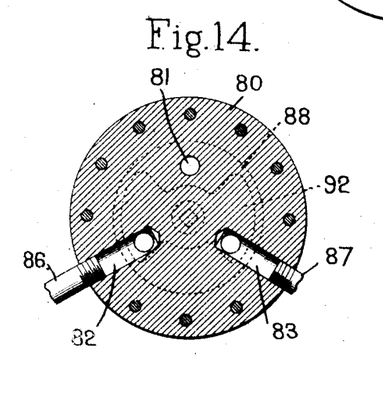
Figs. 14 and 15 are sections on the line 14—14, Fig. 12 illustrating the valve in different positions.
Figure 16:
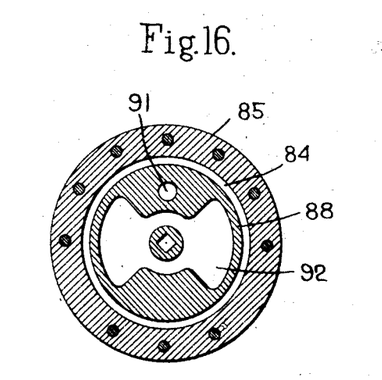
Fig. 16 is a section on the line 16—16 Fig. 12.
Figure 17:
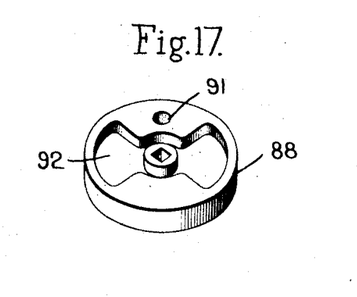
Fig. 17 is a perspective view of the valve 88.
Figure 18:
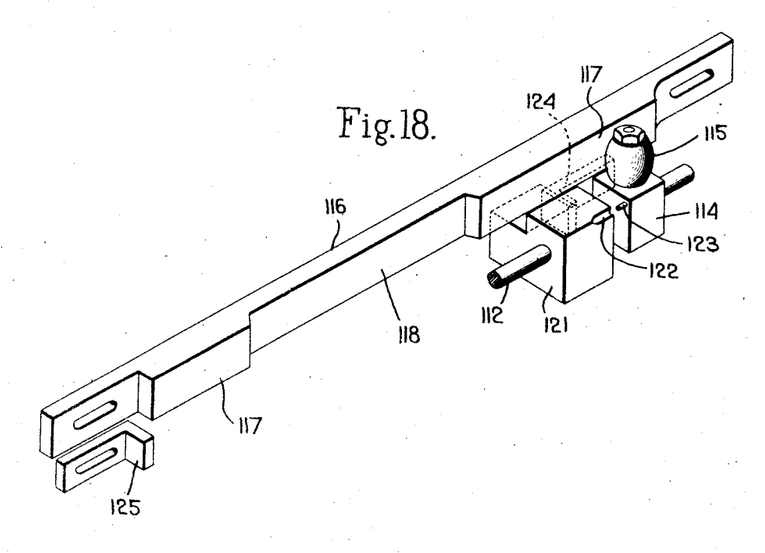
Fig. 18 is a fragmentary perspective view of the means for controlling the operation of the piston 71.

The movement of the piston to the right is secured by introducing air or gas under pressure to the left hand end of the cylinder. The cylinder head 80 at the left hand end of the cylinder is provided with a port 81 extending therethrough and is also provided with two other ports 82 and 83 which communicate with the valve chamber 84 formed within a valve housing 85 that is secured to the end of the cylinder head. The port 82 is connected by a pipe 86 with the upper end of the chamber 76 and the port 83 is connected to an exhaust pipe 87. Situated within the valve chamber 84 is a valve 88 having the construction shown in Figs. 12, 16 and 17. This valve is mounted on a valve stem 89 which extends through the valve housing and is provided with a hand wheel 90 by which it may be turned. The valve is provided with a port 91 which may be brought into alignment with the port 81 as shown in Fig. 12 and is also provided with a cavity or recess 92 having the shape best seen in Figs. 16 and 17. The construction of the valve is such that when the port 91 is registering with the port 81 then both ports 82 and 83 are registering with the cavity 92, and when the ports are in this position the pipe 86 will be in communication with the exhaust pipe 87 through the ports 82, 83 and cavity 92, when, therefore, the valve is adjusted in this position and air or gas under pressure is admitted to the valve chamber 84 through the inlet pipe 93 the piston 71 will be moved to the right thus forcing the oil into the chamber 76, and the air which is in the chamber 76 will be exhausted through the pipes 86, ports 82, 83 and pipe 87.

As stated above the speed at which the piston moves to the right depends upon which of the valves 77, 79 open, and in the operation of the machine, after the tubes have been properly clamped to the welding contact and the current is turned on the valve 88 will be turned in the position shown in Fig. 12 and the by-pass valve 79 will be opened, the main valve 77 being closed. The piston will then be moved to the right but at a relatively slow speed because of the restricted communication between the cylinder 70 and the chamber 76 afforded by the by-pass valve 79. During this slow movement the sparking contact between the ends of the tube 1 and the side of the tube 2 will be produced as above described and when the side of the tube 2 has been brought to the proper welding temperature then the main valve 77 is opened so as to allow the oil or liquid to pass freely from the cylinder 70 to the chamber 76 with the result that the piston will have a rapid movement which will bring the tube 2 against the ends of the tube 1 with a firm pressure thereby to effect the weld.

Figure 9:
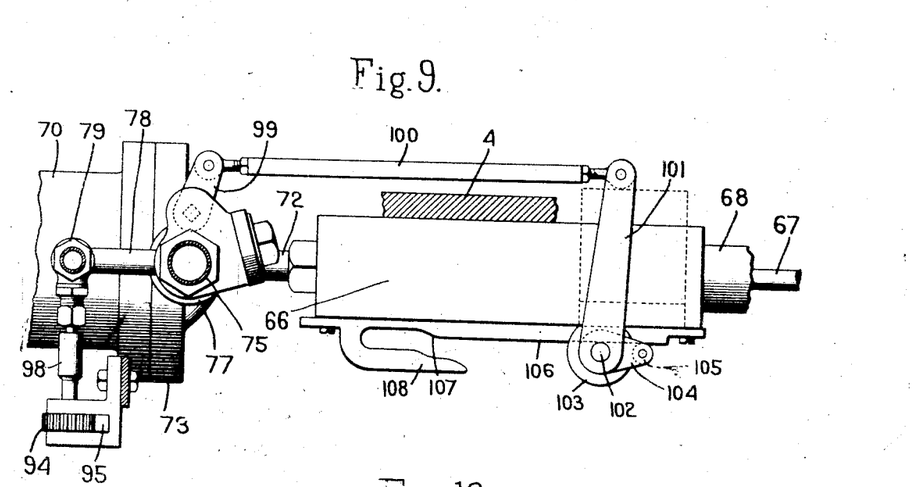
Fig. 9 is a view of the automatic control.

The by-pass valve 79 is operated by hand and the stem 98 thereof is provided with a gear 94 meshing with a rack 95 carried by a connection 96 that is connected to a hand lever 97 so that when the hand lever is properly operated the valve 79 may be opened or closed. The main valve 77 is automatically opened at the proper time and for this purpose said valve is arranged to be opened or closed by the swinging movement of a lever 99. Said lever is connected by a link 100 to an arm 101 carried by a rock shaft 102 journalled in a bracket 103 mounted on the frame. This rock shaft has fast thereto another arm 104 carrying a roll 105 that normally engages a track 106 associated with one of the wedges 66. This track 106 has the inclined or cam portion 107 and it is also provided with a guide finger 108 which forms with the portion 107 a cam groove to receive the roll 105. When the roll 105 rests against the high portion of the track, as shown in Fig. 9, the valve 77 is closed, but as the wedge 66 moves to the right the roll is carried into the cam groove between the inclined portion 107 and finger 108 without rocking the rock shaft and actuating the arm 99 to open the valve 77. This opening movement occurs after the sparking contact has been continued for the proper length of time to heat the side of the tube 2 to the desired welding temperature so that the automatic opening of the valve 77 will result in moving the tube 2 downwardly with a quick movement into firm engagement with the ends of the tube 1 thereby making the weld.

Figure 15:
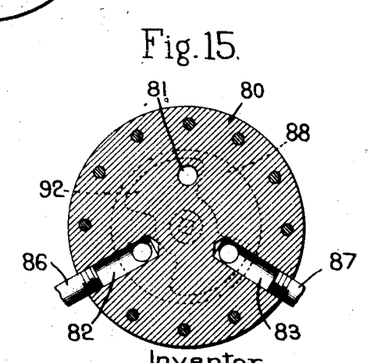

After the weld is made the member 15 is raised into its upper position shown in Fig. 1 by reversing the valve 88 into the position shown in Fig. 15, in which position the port 91 is brought into register with the port 82 and the ports 81 and 83 are both in registry with the chamber 92 of the valve. When in this position the air or gas under pressure will be admitted to the pipe 86 and will thus subject oil or liquid in the chamber 76 to pressure thus forcing oil from the chamber 76 back into the cylinder and returning the piston to its normal position. During this movement the air which is in the left hand end of the cylinder will be exhausted through the port 83 in the exhaust pipe 87.

Figures 10, 11:
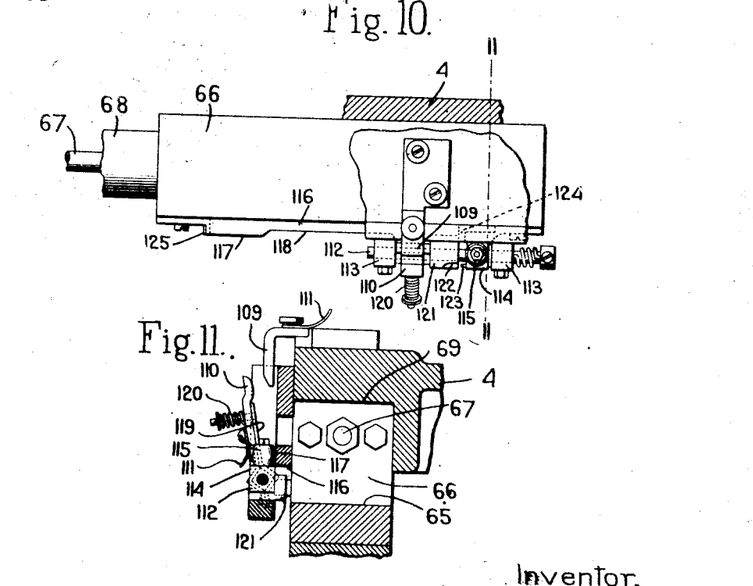
Fig. 10 is a top plan view of the means for opening and closing the circuit.
Fig. 11 is a section on the line 11—11, Fig. 10.

I have also provided herein means for automatically opening the circuit of the transformers when the weld is completed. The circuit of the transformers includes a switch comprising two contacts 109, 110. The contact 109 is mounted but insulated from the frame 4 and has one of the lead wires 111 of the transformer circuit connected thereto. The contact 110 is carried by a rock shaft 112 which is journalled in bearings 113 that are carried by but insulated from the frame. This rock shaft has a block 114 extending therefrom which carries a roll 115 that bears on a track 116 formed on one of the wedges 66. This track has the high portion 117 at each end and a low portion 118 intermediate of the high portion. When the roll is on either high portion 117, as shown in Fig. 11, then the contact 110 is separated from the contact 109, but when the roll is on the low portion 118 the contacts are in engagement. The contact 110 is yieldingly connected to the rock shaft and for this purpose said rock shaft has an arm 119 rigid therewith to which the contact 110 is connected, said contact being yieldingly held in position by a spring 120. The contact 110 is connected to the lead wire 111 of the transformer circuit.

When the wedges 66 are moved to the right the roll 115 will pass off from the high portion of the track onto the low portion thereby closing the welded circuit. When the tube 2 has been brought down into proper position relative to the ends of the tube 1 to provide the sparking contact and as the wedges continue to move to the right during the sparking contact and during the welding operation the roll will remain on the low portion of the track. By the time the weld is completed the wedge will be moved sufficiently to bring the roll onto the high portion of the track at the left hand in Fig. 10 thus automatically opening the welding circuit.

I have provided herein a device for holding the circuit open while the wedges are returned to their normal position and this device comprises a block 121 slidably mounted on the rock shaft 112 and having a bearing against the frame so that it cannot turn on the rock shaft. This block is provided with a notch 122 to receive a pin 123 projecting from the head of the block 114. The wedge 66 carries two stop members 124, 125 situated to engage the block 121 at either end of the travel of the wedge. When the wedge 66 has completed its movement to the right the stop 125 engages the block 121 and slides it on the rock shaft so as to bring the pin 123 into the notch 122. During the movement of the wedge to the right the low portion of the track registers with the roll 115, the rock shaft will be prevented from turning into a position to close the contacts 109, 110 by the engagement of the pin 123 in the notch 122. When the wedge completes its movement to the left the stop 124 engages the block 121 and moves the latter into the position shown in Fig. 10 thus freeing the pin from the notch. At this time, however, the roll is in engagement with the high portion of the track so that the contacts 109, 110 are maintained separated from each other. The contact 110, however, is free to close against the contact 109 when the wedge moves again to the right and moves the low portion of the track into register with the roll 115.

From the above it will be seen that I have provided means for simultaneously welding the ends of a plurality of tubes to the side of another tube and also that the control of the tubes and the control of the welding operation is automatic.

I claim:

1. In a welding machine, the combination with work-holding means constructed to hold a plurality of separate elements with their ends in position to be welded to the side of another element, of electrical means to heat simultaneously the portions of said elements that are to be welded together, and means for controlling automatically the work-holding means and operating first to produce a slow relative movement of the heated ends of said elements toward the side of the other element and then to give a quick relative movement thereby to force the ends firmly against said side.

2. In a welding machine, the combination with work-holding means constructed to hold a plurality of separate elements with their ends in position to be welded to the side of another element, of electrical means to heat simultaneously the portions of said elements that are to be welded together, and means for controlling automatically the work-holding means and operating to maintain a sparking contact between said ends of the elements and the side of the other element until the portions of said side of the element to which the ends are to be welded has a welding temperature and then to force the ends firmly against said side.

3. In a welding machine, the combination with means to support a plurality of tubes in parallel relation, of means to support another tube in position to be welded to the ends of the parallel tubes, a separate welding circuit for heating each tube end and the portion of the tube side to which said end is to be welded, and means to move said parallel tubes simultaneously against the side of the other tube.

4. In a welding machine, the combination with means to support a plurality of tubes in parallel relation, of means to support another tube in position to be welded to the ends of the parallel tubes, means constituting a separate circuit for heating each tube end and the portion of the side of the other tube to which the tube end is to be welded, and means for operating the tube-supporting means to cause a sparking contact to be maintained between the ends of the tubes and the side of the other tube for an interval of time sufficient to permit the side of the tube to be brought to welding temperature and then to force the tube ends against the side of the tube.

5. In a welding machine, the combination with tube-supporting means, constructed to support a plurality of tubes in parallel relation, of means to support another tube in position to be welded to the ends of the parallel tubes, said supporting means including a contact to engage each tube end and a plurality of contacts, one for each tube end, engaging the side of the other tube, a separate welding circuit for each contact that engages a tube end and the corresponding contact that engages the tube side, and means to cause the tube ends to be forced simultaneously against the side of the other tube.

6. In a welding machine, the combination with tube-supporting means constructed to support a plurality of tubes in parallel relation, of means to support another tube in position to be welded to the ends of the parallel tubes, said supporting means including a contact to engage each tube end and a plurality of contacts, one for each tube end, engaging the side of the other tube, a separate welding circuit for each contact that engages a tube end and the corresponding contact that engages the tube side, and means controlling the tube-supporting means by which a sparking contact is maintained between the ends of the tubes and the side of the tube for a predetermined interval after which the tube ends are forced against the side of the tube.

7. In a welding machine, the combination with a plurality of pairs of welding contacts, one contact of each pair being constructed to embrace a tube and the other contact of each pair being shaped to engage the side of a tube, the latter contacts of all the pairs being in alinement and all adapted to have contact simultaneously with the same tube, of a separate welding circuit for the contacts of each pair.

8. In a welding machine, the combination with a plurality of pairs of welding contacts, each pair of contacts presenting a tube-side engaging contact and a tube-end-engaging contact, the former contacts of all the pairs being situated to have contact simultaneously with the side of a single tube, of means to clamp a tube in the tube-side-engaging contacts, means to support a plurality of tubes with their ends operatively engaged by the tube-end-engaging contacts and in position to be welded to the side of the first-named tube, and a separate welding circuit for the contacts of each pair.

9. In a welding machine, the combination with a plurality of pairs of welding contacts, each pair of contacts presenting a tube-side-engaging contact and a tube-end-engaging contact, the former contacts of all the pairs being situated to have contact simultaneously with the side of a single tube, means to clamp a tube in the tube-side-engaging contacts, means to support a plurality of tubes with their ends operatively engaged by the tube-end-engaging contacts and in position to be welded to the side of the first-named tube, a welding transformer operatively connected to each pair of contacts, and means to energize said transformers simultaneously.

10. The combination with a plurality of pairs of welding contacts, each pair of contacts presenting a tube-side-engaging contact and a tube-end-engaging contact, the former contacts of all the pairs being situated to have contact simultaneously with a single tube, means to support a plurality of tubes with their ends operatively engaged by the tube-end-engaging contacts and in position to be welded to the side of a tube sustained in the first-named contacts, a separate welding circuit for the contacts of each pair, and means to move the tube-side engaging contacts towards the tube-end-engaging contacts during the welding operation.

11. In a welding machine, the combination with a contact member shaped to engage the side of a tube, of a second contact member shaped to engage the end of a tube which is in position to be welded to the side of a tube held in the first-named contact, means for yieldingly supporting said first-named contact for movement toward the other contact, means connecting said contacts with the welding circuit, and means to move the first-named contact toward the second-named contact during the welding operation.

12. In a welding machine, the combination with welding contacts constructed to hold the end of a tube in close proximity to the side of another tube, of means to cause a welding current to pass from one to the other contact, and means controlling the relative position of said contacts which operates first to give the contacts a gradual relative movement towards each other thereby to maintain a sparking contact between said end of the first-mentioned tube and the side of the other tube and then to give said contacts a quick relative movement toward each other thereby to press the tubes firmly into welding contact.

13. In a welding machine, the combination with a pair of welding contacts constructed to hold the end of a tube in close proximity to the side of another tube, of a transformer having its secondary connected to said contacts, and means for moving said contacts relative to each other, said means operating first to give the contacts a gradual relative movement toward each other thereby to maintain a sparking contact between said end of the first-mentioned tube and the side of the other tube, and then to give said contacts a quick relative movement toward each other thereby to effect the weld.

14. In a welding machine, the combination with a plurality of pairs of welding contacts constructed to hold the ends of a plurality of tubes in close proximity to the side of another tube, means to cause a welding current to pass from one to the other contact of each pair, and means controlling the relative position of the contacts of each pair, which means operates first to give the contacts of each pair a gradual relative movement toward each other thereby to maintain a sparking contact between the ends of the plurality of tubes and the side of the other tube and then to give the contacts of each pair a quick relative movement toward each other to press the tubes firmly into welding contact.

15. In a welding machine, the combination with a plurality of pairs of contacts constructed to hold the ends of a plurality of tubes in close proximity to the side of another tube, of a welding transformer connected to each pair of contacts, and means for producing a relative movement of the contacts of each pair towards each other by which said contacts have first a slow relative movement thereby to produce a sparking contact between the end of each of said plurality of tubes and the side of the other tube and then to have a quick relative movement to produce the weld.

16. In a welding machine, the combination with a plurality of pairs of contacts adjustable toward and from each other and constructed to hold the ends of a plurality of tubes in close proximity to the side of another tube, of a welding transformer connected to each pair of contacts, and means for producing a relative movement of the contacts of each pair towards each other by which said contacts have first a slow relative movement and then a quick relative movement.

17. In a welding machine, the combination with a plurality of tube-side-engaging contacts, all of which are adapted to engage the side of a tube, of a similar number of tube-end-engaging contacts, each adapted to engage a tube end, means supporting said contacts so that the tube end held in the latter contacts will be in close proximity to the side of the tube supported in the tube-side-engaging contacts, means to cause a current to pass between each tube-end-engaging contact and the corresponding tube-side-engaging contact, and means to produce a slow relative movement of the tube-side-engaging contacts and the tube-end-engaging contacts toward each other while said current is operative.

18. In a welding machine, the combination with a plurality of tube-side-engaging contacts, all of which are adapted to engage the side of a tube, of a similar number of tube-end-engaging contacts, each adapted to engage a tube end, means supporting said contact so that the tube ends held in the latter contacts will be in close proximity to the side of the tube supported in the tube-side-engaging contacts, means to cause a current to pass between each tube-end-engaging contact and the corresponding tube-side-engaging contact, and means to produce first a slow relative movement of the tube-side-engaging contacts and the tube-end-engaging contacts towards each other during which a sparking contact between the ends of the tube and the sides of the first named tube is maintained and then to produce a quick relative movement of the tube-side-engaging contacts and the tube-end-engaging contacts towards each other thereby to apply a welding pressure to the tubes.

19. In a welding machine, the combination with a plurality of pairs of contacts, each pair comprising a tube-side-engaging contact and a tube-end-engaging contact, of means supporting the tube-side-engaging contacts in alinement whereby they may all have contact with the side of the same tube, a welding transformer connected to each pair of contacts, and means to move the tube-side-engaging contacts simultaneously toward the tube-end-engaging contacts thereby to maintain a sparking contact between the ends of tubes held in the tube-end-engaging contacts and the side of the tube in the other contacts.

20. In a welding machine, the combination with a frame, of means to support a tube, a plurality of tube-side-engaging contacts mounted thereon and adapted to engage the side of a tube, a tube support mounted on the frame for adjustment toward and from said contacts and provided with means to sustain a plurality of tubes with their ends in position to be welded to another tube carried by said contacts, and means to weld said tube ends to said other tube.

21. In a welding machine, the combination with a frame, of a plurality of tube-side-engaging contacts thereon adapted to engage the side of and sustain a tube, a tube support mounted on the frame and provided with means to sustain in parallel relation a plurality of tubes with their ends in position to be welded to the side of the first-named tube, and means to weld simultaneously said tube ends to said tube side.

22. In a welding machine, the combination with a frame, of a plurality of tube-side-engaging contacts thereon, a tube support mounted on the frame and provided with adjustable means to sustain a plurality of tubes with their upper ends in position to be welded to the side of a tube sustained by the tube-side-engaging contacts, and means to weld simultaneously said tube ends to the side of the tube.

23. In a welding machine, the combination with a frame of a plurality of welding transformers adjustably mounted thereon for adjustment toward and from each other, a pair of welding contacts connected to and adjustable with each transformer, said contacts being constructed to hold the ends of a plurality of tubes in position to be welded to the side of another tube.

24. In a welding machine, the combination with a frame, of a plurality of welding transformers adjustably mounted thereon for adjustment toward and from each other, a pair of welding contacts connected to and adjustable with each transformer, said contacts being constructed to hold the ends of a plurality of tubes in position to be welded to the side of another tube, and means to energize said transformers simultaneously.

25. In a welding machine, the combination with work-holding means constructed to hold a plurality of elements with their ends in position to be welded to the side of another element, of means to heat simultaneously the portions of said elements that are to be welded together, and pneumatically-operated means for controlling the work-holding means to cause the heated end of a plurality of elements to be forced simultaneously against the side of the other elements thereby to weld simultaneously said ends of said side.

26. In a welding machine, the combination with work-holding means constructed to hold a plurality of elements with their ends in position to be welded to the side of another element, of means to heat simultaneously the portions of said elements that are to be welded together, and pneumatically-operated means for controlling the work-holding means and operating first to produce a slow relative movement of the heated ends of said elements toward the side of the other element and then to give a quick relative movement thereby to force the ends firmly against said side.

27. In a welding machine, the combination with tube-holding means constructed to hold a plurality of tubes with their ends in position to be welded to the side of another tube, of means to heat simultaneously said tube ends and the tube side to which the ends are to be welded, and pneumatically-controlled means operating to maintain a sparking contact between said tube ends and the tube side, and subsequently to move the tube ends firmly against the tube side.

28. In a welding machine, the combination with welding contacts constructed to hold the end of a tube in close proximity to the side of another tube, of means to cause a welding current to pass from one contact to the other, and pneumatically-controlled means for determining the relative position of said contacts, said means operating first to give the contacts a gradual relative movement toward each other thereby to maintain a sparking contact between said tube end and the side of the other tube and then to give said contacts a quick relative movement thereby to press the tubes firmly into welding contact.

29. In a welding machine, the combination with tube welding contacts constructed to hold the end of a tube in close proximity to the side of another tube, of means to cause a welding current to pass from one to the other contact, means for controlling the relative position of said contacts which comprises a cylinder, a plunger therein, pneumatic means to actuate the plunger, and a plunger-restraining device operating first to permit a slow movement only of the plunger and subsequently to permit a rapid movement thereof.

30. In a welding machine, the combination with welding contacts constructed to hold the end of a tube in close proximity to the side of another tube, of means to cause a welding current to pass from one contact to the other, means controlling the relative position of said contacts comprising a cylinder containing a liquid, a plunger therein, means to move the plunger in the cylinder, said cylinder having a discharge pipe, and means operating during the first part of the movement of the piston to restrict the passage of liquid through the discharge pipe and during the latter portion of said movement to allow free passage of the liquid therethrough.

31. In a welding machine, the combination with a plurality of pairs of contacts constructed to hold the ends of a plurality of tubes in close proximity to the side of another tube, of means to cause a welding current to pass from one to the other contact of each pair, a wedge device for producing relative movement of the contacts of each pair toward each other, and means to actuate said wedge device thereby to give the contacts first a slow relative movement to produce a sparking contact between the end of each of said plurality of tubes and the side of the other tube, and then to give said contact a quick relative movement to produce the weld.

32. In a welding machine, the combination with a plurality of pairs of contacts constructed to hold the ends of a plurality of tubes in close proximity to the side of another tube, of means to cause a welding current to pass from one to the other contact of each pair, a wedge device for producing a relative movement of the contacts of each pair toward each other, a cylinder, a plunger therein connected to the wedge device, means to move the cylinder in the plunger, and means operating to retard the initial movement of the plunger whereby the contacts will have a slow relative movement toward each other and a sparking contact will be maintained between each tube end and the side of the other tube, and means to render the retarding means inoperative during the final movement of the plunger whereby the contacts have a quick movement toward each other for the purpose of producing the weld.

In testimony whereof, I have signed my name to this specification.

FRANCIS G. GALE.